(12) United States Patent
Suzuki et al.

(10) Patent No.: US 7,708,109 B2
(45) Date of Patent: May 4, 2010

(54) ELECTRIC POWER STEERING APPARATUS

(75) Inventors: Hiroshi Suzuki, Okazaki (JP); Terutaka Tamaizumi, Okazaki (JP); Hirozumi Eki, Okazai (JP); Kenji Nishimura, Gotemba (JP)

(73) Assignees: JTEKT Corporation, Osaka-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 185 days.

(21) Appl. No.: 11/860,058

(22) Filed: Sep. 24, 2007

(65) Prior Publication Data

US 2008/0217096 A1 Sep. 11, 2008

(30) Foreign Application Priority Data

Sep. 26, 2006 (JP) .............................. 2006-261104
Feb. 5, 2007 (JP) .............................. 2007-025537

(51) Int. Cl.
*B62D 5/04* (2006.01)

(52) U.S. Cl. ...................... 180/446; 180/444; 180/443; 701/41; 701/42; 701/43

(58) Field of Classification Search ................ 180/446, 180/444, 443; 701/41, 42, 43
See application file for complete search history.

(56) References Cited

U.S. PATENT DOCUMENTS 6,148,949 A * 11/2000 Kobayashi et al. .......... 180/446
6,968,920 B2 * 11/2005 Barton et al. ............... 180/446
7,374,014 B2 * 5/2008 Yasui et al. ................. 180/446
2003/0144780 A1 * 7/2003 Recker et al. ................. 701/41
2003/0213640 A1 * 11/2003 Kato et al. .................. 180/446
2004/0133321 A1 * 7/2004 Ghoneim et al. .............. 701/41
2004/0193345 A1 * 9/2004 Chen et al. .................... 701/42
2005/0189163 A1 * 9/2005 Barton et al. ............... 180/446
2005/0205346 A1 * 9/2005 Aizawa et al. ............. 180/446
2006/0089770 A1 * 4/2006 Ito ................................ 701/41

FOREIGN PATENT DOCUMENTS

| JP | 6-312666 | 11/1994 |
| JP | 8-15865 | 2/1996 |
| JP | 2000-104219 | 4/2000 |
| JP | 2002-104219 | 4/2002 |

OTHER PUBLICATIONS

U.S. Appl. No. 12/273,881, filed Nov. 19, 2008, Tamaizumi.
U.S. Appl. No. 12/354,401, filed Jan. 15, 2009, Nozawa.
U.S. Appl. No. 12/355,118, filed Jan. 16, 2009, Nozawa et al.
U.S. Appl. No. 12/435,046, filed May 4, 2009, Tamaizumi et al.

* cited by examiner

*Primary Examiner*—Lesley Morris
*Assistant Examiner*—Marlon A Arce
(74) *Attorney, Agent, or Firm*—Oblon, Spivak, McClelland, Maier & Neustadt, L.L.P.

(57) ABSTRACT

An ECU determines whether the orientation of the vehicle is deflecting at the time of braking. In addition, in a case where it is determined that the orientation of the vehicle is deflecting, the ECU controls operation of an EPS actuator in order to reduce the assist force provided to the steering system.

17 Claims, 9 Drawing Sheets

ELECTRIC POWER STEERING APPARATUS

BACKGROUND OF THE INVENTION

The present invention relates to an electric power steering apparatus.

Figure 9:
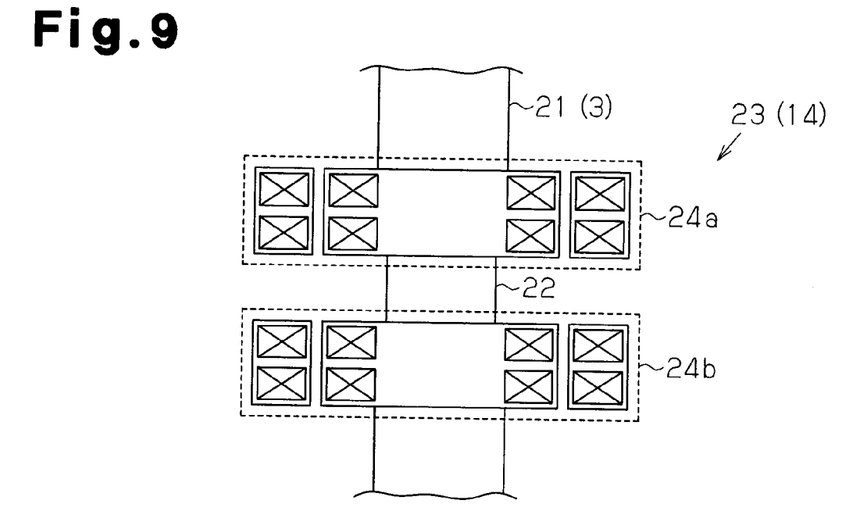
FIG. 9 is a diagram schematically showing the configuration of a torque sensor.

In recent years, electric power steering apparatuses (EPS) using a motor as a drive source have been widely adopted as power steering apparatuses for vehicles. Japanese Laid-Open Patent Publication No. 2002-104219 discloses an EPS having a torque sensor 23 which detects steering torque on the basis of the torsion angle of a torsion bar 22 provided in the middle of the steering transmission system (a steering shaft 21) connecting the steering wheel and the steered wheels, as shown in FIG. 9. This EPS controls the assist force provided in the steering system on the basis of the steering torque detected by the torque sensor 23. FIG. 9 is a diagram schematically showing the configuration of a sensor which is widely adopted as a torque sensor for EPS's, that is to say, a twin resolver type torque sensor for detecting the torsion angle of the torsion bar 22 by means of a pair of angle sensors 24a and 24b (resolvers) provided at both ends of the torsion bar 22.

Figure 10:
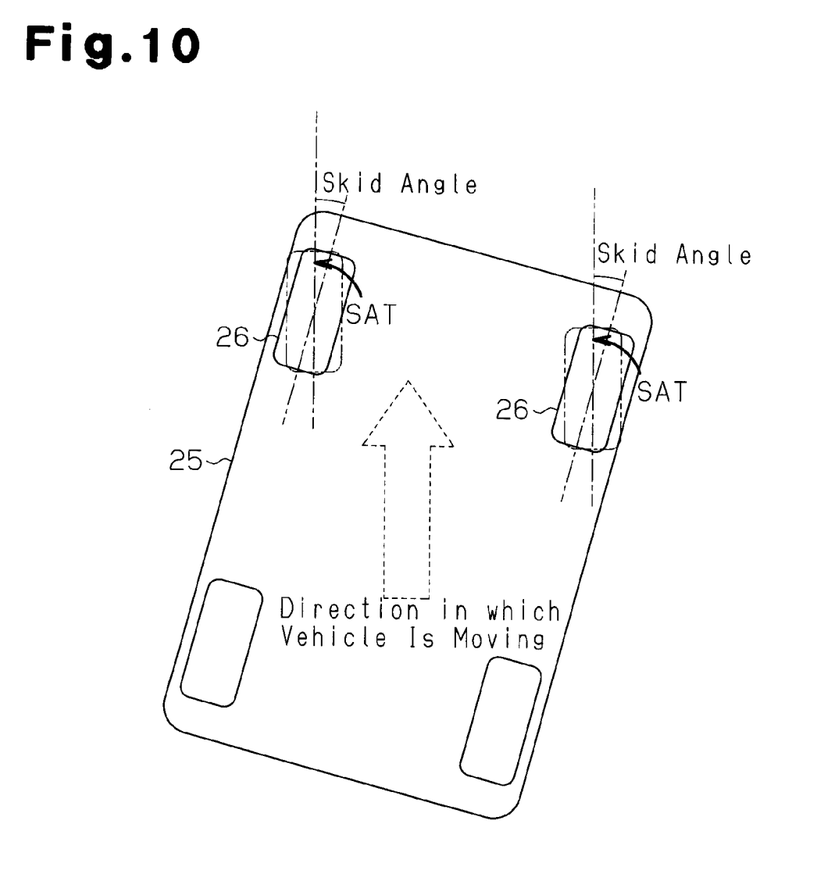
FIG. 10 is a diagram showing the relationship between the deflection of the orientation of a vehicle at the time of braking and self aligning torque.

At the time of braking of a vehicle, particularly at the time of sudden braking, and in cases where the road on which the vehicle is running is a low μ road sloping downward, the orientation of the vehicle sometimes deflects due to a lack of, for example, weight balance or braking force balance, despite the fact that the steering angle is constant, for example when the brakes are applied during straight driving. In such cases, self aligning torque (SAT) for turning the steered wheels in the direction opposite to the direction in which the vehicle deflects acts on the steered wheels. In the case where the vehicle 25 deflects to the right, as shown in FIG. 10, for example, the self aligning torque acts on the steered wheels 26 in such a direction that the steered wheels 26 turn to the left, that is to say, in such a direction that the orientation of the vehicle is stabilized.

In the cases described above, however, the steering torque in the direction in which the vehicle deflects is detected by the torque sensor on the basis of the torsion of the torsion bar which is caused when the driver maintains the steering angle, that is to say, torsion of the torsion bar which is caused when the rotation of the steering wheel generated on the basis of the self aligning torque is restricted. Therefore, in vehicles having EPS, the EPS operates on the basis of the steering torque detected by the torque sensor, and thus, assist force is provided in such a direction that the self aligning torque which acts in such a direction as to stabilize the vehicle is canceled. As a result, a problem arises, such that the vehicle drifts in the direction in which the vehicle deflects.

SUMMARY OF THE INVENTION

Accordingly, it is an objective of the present invention to provide an electric power steering apparatus which makes braking possible while stably maintaining the orientation of the vehicle.

To achieve the foregoing objective and in accordance with a first aspect of the present invention, an electric power steering apparatus for a vehicle having a steering system and a torsion bar provided in the middle of a steering transmitting system connecting a steering wheel to a steered wheel is provided. The apparatus includes a steering force assisting device having a motor, a torque sensor for detecting steering torque on the basis of the torsion angle of the torsion bar, a control section, and a deflection sensing section for sensing deflection in the orientation of the vehicle. The steering force assisting device provides assist force for assisting the steering operation of the steering system using the motor as a drive source. The control section controls the assist force generated by the steering force assisting device on the basis of the detected steering torque. The control section reduces the assist force generated by the steering force assisting device in the case where deflection is sensed at the time of braking of the vehicle.

In accordance with a second aspect of the present invention, an electric power steering apparatus for a vehicle having a steering system and a torsion bar provided in the middle of a steering transmitting system connecting a steering wheel to a steered wheel is provided. The apparatus includes a steering force assisting device having a motor, a torque sensor for detecting steering torque on the basis of the torsion angle of the torsion bar, and a control section. The steering force assisting device provides assist force for assisting the steering operation to the steering system using the motor as a drive source. The control section controls the assist force generated by the steering force assisting device on the basis of the detected steering torque. The control section reduces the assist force generated by the steering force assisting device in the case where the vehicle speed is a predetermined speed or higher at the time of braking of the vehicle.

In accordance with a third aspect of the present invention, an electric power steering apparatus for a vehicle having a steering system and a torsion bar provided in the middle of a steering transmitting system connecting a steering wheel to a steered wheel is provided. The apparatus includes a steering force assisting device having a motor, a torque sensor for detecting steering torque on the basis of the torsion angle of the torsion bar, a control section, and a deflection predicting section. The steering force assisting device provides assist force for assisting the steering operation to the steering system using the motor as a drive source. The control section controls the assist force generated by the steering force assisting device on the basis of the detected steering torque. The deflection predicting section predicts deflection in the orientation of the vehicle at the time of braking of the vehicle. The control section reduces the assist force generated by the steering force assisting device in the case where deflection is predicted.

DETAILED DESCRIPTION OF THE PREFERRED EMBODIMENTS

First Embodiment

Figure 1:
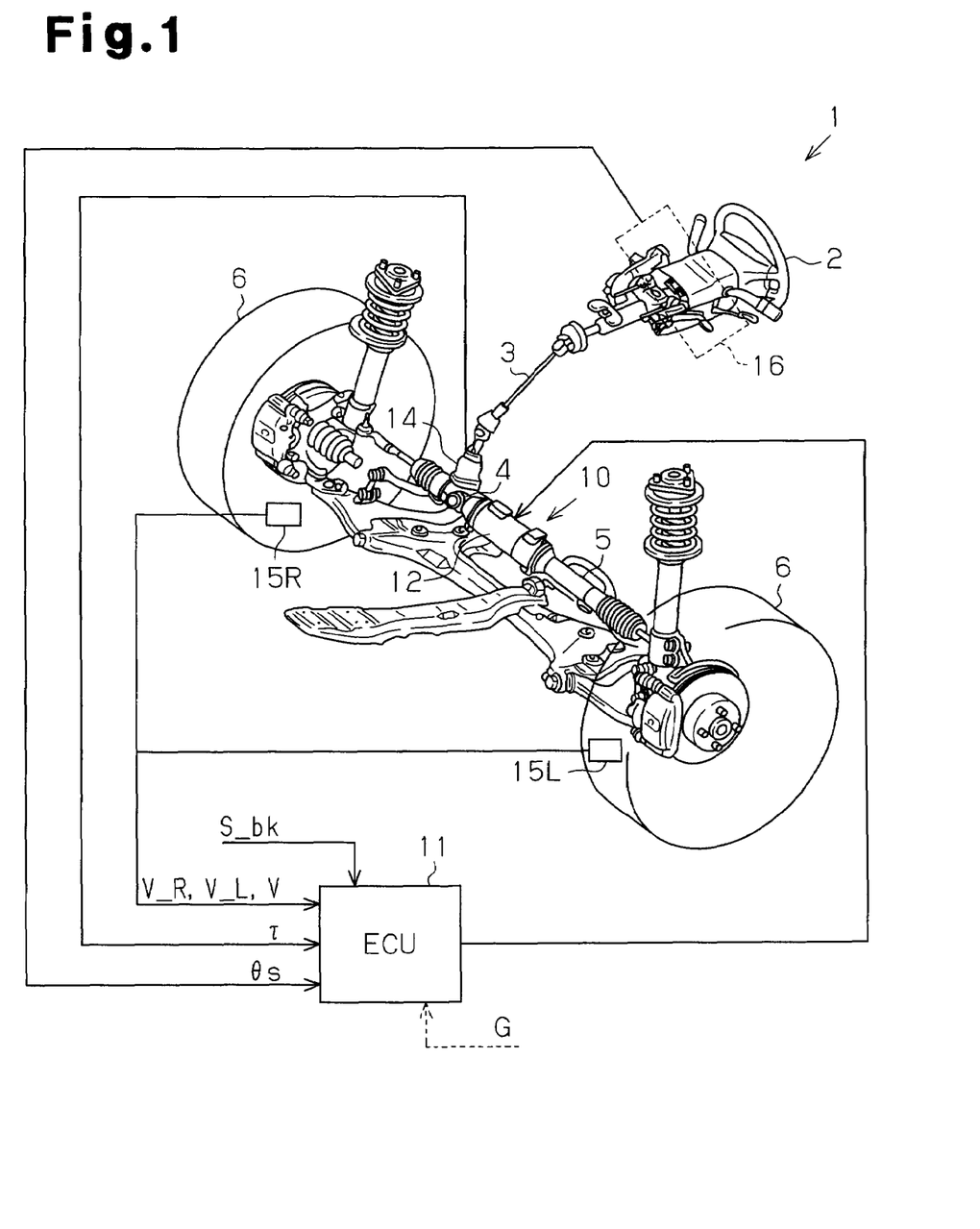
FIG. 1 is a diagram schematically showing the configuration of an electric power steering apparatus (EPS)

In the following, an electric power steering apparatus according to a first embodiment of the present invention will be described with reference to the drawings. FIG. 1 is a diagram schematically showing the configuration of the electric power steering apparatus (EPS) 1 according to the present embodiment. As shown in FIG. 1, a steering shaft 3 to which a steering wheel 2 is secured is connected to a rack 5 via a rack and pinion mechanism 4. Rotation of the steering shaft 3 accompanying operation of the steering wheel 2 is converted into linear reciprocation of the rack 5 by means of the rack and pinion mechanism 4. This linear reciprocation of the rack 5 changes the angle of the steered wheels 6, that is to say, the steered angle, and thus, the direction in which the vehicle moves changes.

The EPS 1 is provided with an EPS actuator 10, which is a steering force assisting device for providing assist force to assist operation of the steering wheel 2 to the steering system, and an ECU 11, which is a control section for controlling the operation of this EPS actuator 10.

The EPS actuator 10 according to the present embodiment is a rack assist type EPS actuator, in which a motor 12, which is a drive source for the system, is coaxially placed with the rack 5. The motor torque generated by the motor 12 is transmitted to the rack 5 via a ball screw mechanism (not shown). The motor 12 according to the present embodiment is a brushless motor which rotates when receiving supply of drive power in three phases (U, V and W) from the ECU 11. The ECU 11 controls operation of the EPS actuator 10, that is to say, assist force provided to the steering system, through the supply of drive power to the motor 12.

In detail, according to the present embodiment, a torque sensor 14 is provided in the middle of the steering shaft 3, which constitutes the steering transmission system between the steering wheel 2 and the steered wheels 6. Steering torque $\tau$, which is detected by this torque sensor 14, is inputted into the ECU 11. As the torque sensor 14 according to the present embodiment, a publicly known twin resolver type torque sensor having the same configuration as the torque sensor 23 shown in FIG. 9, that is to say, a torque sensor for detecting the steering torque $\tau$ on the basis of the torsion angle of the torsion bar 22 provided in the middle of the steering shaft 3 (21) is used. Left and right wheel speeds V_L and V_R, which are detected by wheel speed sensors 15L and 15R, and the vehicle speed V are input into the ECU 11. In addition, the ECU 11 controls the operation of the EPS actuator 10 in such a manner that assist force is generated in accordance with the steering torque $\tau$ and the vehicle speed V, concretely, assist force which is greater when (the absolute value of) the steering torque $\tau$ is greater and the vehicle speed V is lower is generated.

[Orientation Stabilizing Control During Braking]

As described above, when the orientation of a vehicle having an EPS deflects at the time of braking, the driver restricts rotation of the steering wheel, and thus, assist force is provided in such a direction that the self aligning torque (SAT) which acts in such a direction as to stabilize the vehicle is cancelled. As a result, a problem arises, such that the vehicle drifts in the direction in which the vehicle deflects.

The ECU 11 according to the present embodiment determines whether the orientation of the vehicle deflects at the time of braking. That is to say, the ECU 11 according to the present embodiment functions as a deflection sensing section. In addition, in the case where it is determined that the orientation of the vehicle is deflecting, the operation of the EPS actuator 10 is controlled in order to reduce the assist force provided to the steering system. In the following description, this control is referred to as orientation stabilizing control during braking.

Figure 2:
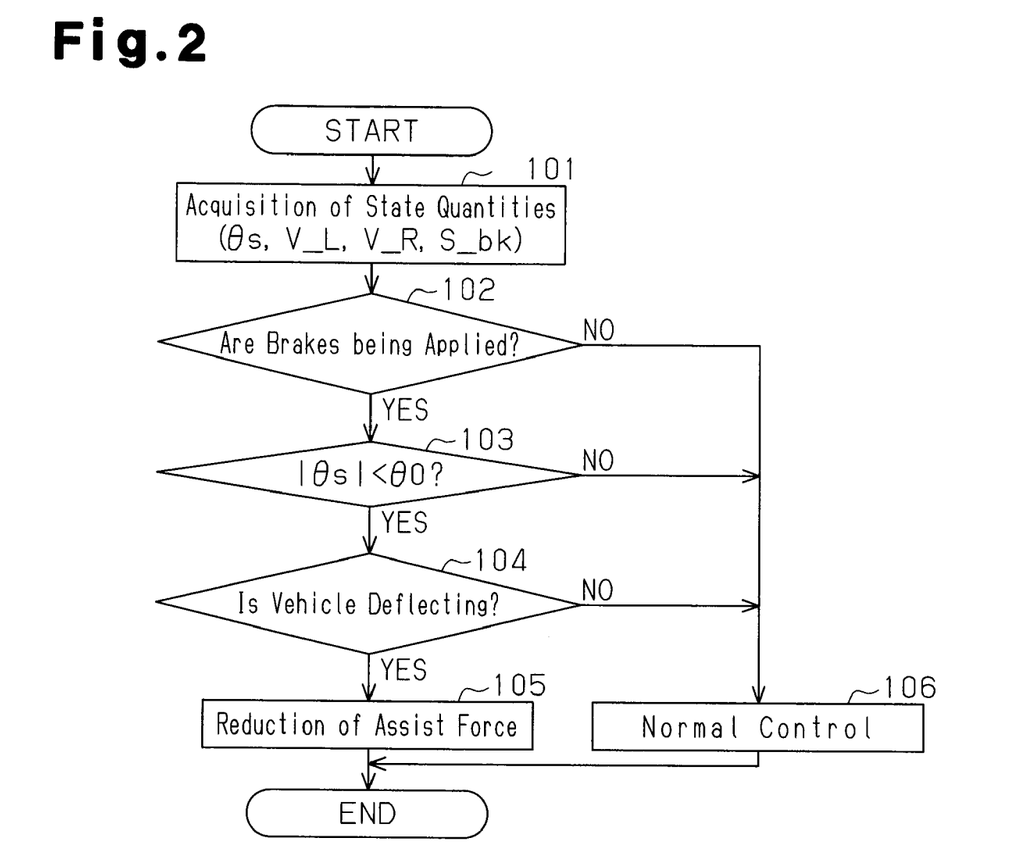
FIG. 2 is a flowchart showing the process for orientation stabilizing control during braking according to a first embodiment.

In detail, as shown in the flowchart of FIG. 2, the ECU 11 first acquires state quantities, which are used for the orientation stabilizing control during braking (Step 101). The steering angle $\theta$s detected by the steering sensor 16 and the brake signal S_bk indicating whether a braking operation is being carried out, in addition to the above described steering torque $\tau$, the vehicle speed V, and the left and right wheel speeds V_L and V_R, are inputted into the ECU 11 according to the present embodiment.

Next, the ECU 11 determines whether the vehicle is being braked on the basis of the brake signal S_bk (Step 102). In the case where the vehicle is being braked (YES in Step 102), the ECU 11 determines whether the absolute value of the steering angle $\theta$s is smaller than the predetermined threshold value $\theta$0, in other words, whether the steering angle is within a predetermined angle range in the vicinity of neutral, that is to say, whether the brakes are being applied in a state where the vehicle is moving approximately straight forward (Step 103). In the case where the absolute value of the steering angle $\theta$s is smaller than the predetermined threshold value $\theta$0 (YES in Step 103: $|\theta s|<\theta 0$), the ECU 11 determines whether the orientation of the vehicle is deflecting on the basis of the steering angle $\theta$s and the left and right wheel speeds V_L and V_R (Step 104). In the case where it is determined that the orientation of the vehicle is deflecting (YES in Step 104), control for reducing assist force generated by the EPS actuator 10 is carried out (Step 105).

In the case where the conditions for determination in the above described Steps 102 through 104 are not met, that is to say, in the case where it is determined that the brakes are not being applied (NO in Step 102), the absolute value of the steering angle $\theta$s is not smaller than the predetermined threshold value $\theta$0 (NO in Step 103), or the orientation of the vehicle is not deflecting (NO in Step 104), the ECU 11 does not carry out the assist force reducing process in Step 105. In addition, the ECU 11 carries out normal control. That is to say, the ECU 11 controls the operation of the EPS actuator 10 in order to generate assist force in accordance with the steering torque $\tau$ and the vehicle speed V (Step 106).

The first embodiment has the following advantages.

(1) The ECU 11 determines whether the orientation of the vehicle deflects at the time of braking. In addition, in the case where it is determined that the orientation of the vehicle is deflecting, the operation of the EPS actuator 10 is controlled in order to reduce the assist force provided to the steering system. According to this configuration, the self aligning torque, which acts in such a direction as to stabilize the vehicle, can be effectively used when the vehicle is deflecting. As a result, it becomes possible to apply the brakes in a simple configuration in a state where the orientation of the vehicle is more stably maintained.

(2) The assist force when the vehicle is deflecting is reduced in the case where the absolute value of the steering angle $\theta$s is smaller than the predetermined threshold value $\theta$0, in other words, in the case where the steering angle is within a predetermined angle range in the vicinity of neutral. That is to say, in some cases, the driver combines the steering operation and the braking operation so as to intentionally cause the orientation of the vehicle to deflect when turning. In this respect, the assist force can be reduced when the state of the vehicle is limited to one in which the vehicle moves straight forward in the above described configuration. Thus, the special cases described above can be excluded, and the orientation of the vehicle can be prevented with high precision from deflecting in a manner not intended by the driver.

Second Embodiment

In the following, an EPS according to a second embodiment of the present invention will be described in reference to the drawings. The main difference between the present embodiment and the first embodiment is only in the manner for orientation stabilizing control during braking. Therefore, for the sake of convenience, in the description, the same symbols are attached to components which are the same as in the first embodiment, and description thereof is omitted.

According to the present embodiment, an ECU 11 detects the vehicle speed V and forward/backward acceleration (longitudinal acceleration) G of the vehicle as a vehicle state quantity. In addition, in the case where the detected forward/backward acceleration G has a value which indicates deceleration which is greater than a predetermined value G1 (a negative value in the case where a value in the direction in which the vehicle moves is defined as a positive value, that is to say $G \leq -G1$) and in the case where the vehicle speed V is greater than the predetermined speed V1, the operation of the EPS actuator 10 is controlled in order to reduce the assist force provided to the steering system.

That is to say, in the case where the detected forward/rearward acceleration G has a value which indicates deceleration greater than the predetermined value G1 (for example −0.8 G), which is considered to be sudden application of the brakes causing deceleration no smaller than the predetermined deceleration, and if the vehicle speed V has a value indicating that the vehicle is running at high speed no less than the predetermined speed V1 (for example 100 km/h), the possibility of the orientation of the vehicle deflecting as described above is extremely high.

The ECU 11, which is a deflection predicting section according to the present embodiment, predicts that the orientation of the vehicle will deflect in the case described above ($G \leq -G1$ and $V \geq V1$). In addition, the assist force provided to the steering system is reduced in advance, that is to say, control for reducing assistance is carried out, before the predicted deflection occurs. As a result, the self aligning torque (SAT) generated afterwards, that is to say, the SAT, which acts in such a direction as to stabilize the vehicle, is used effectively, so that the orientation of the vehicle is quickly stabilized.

Figure 3:
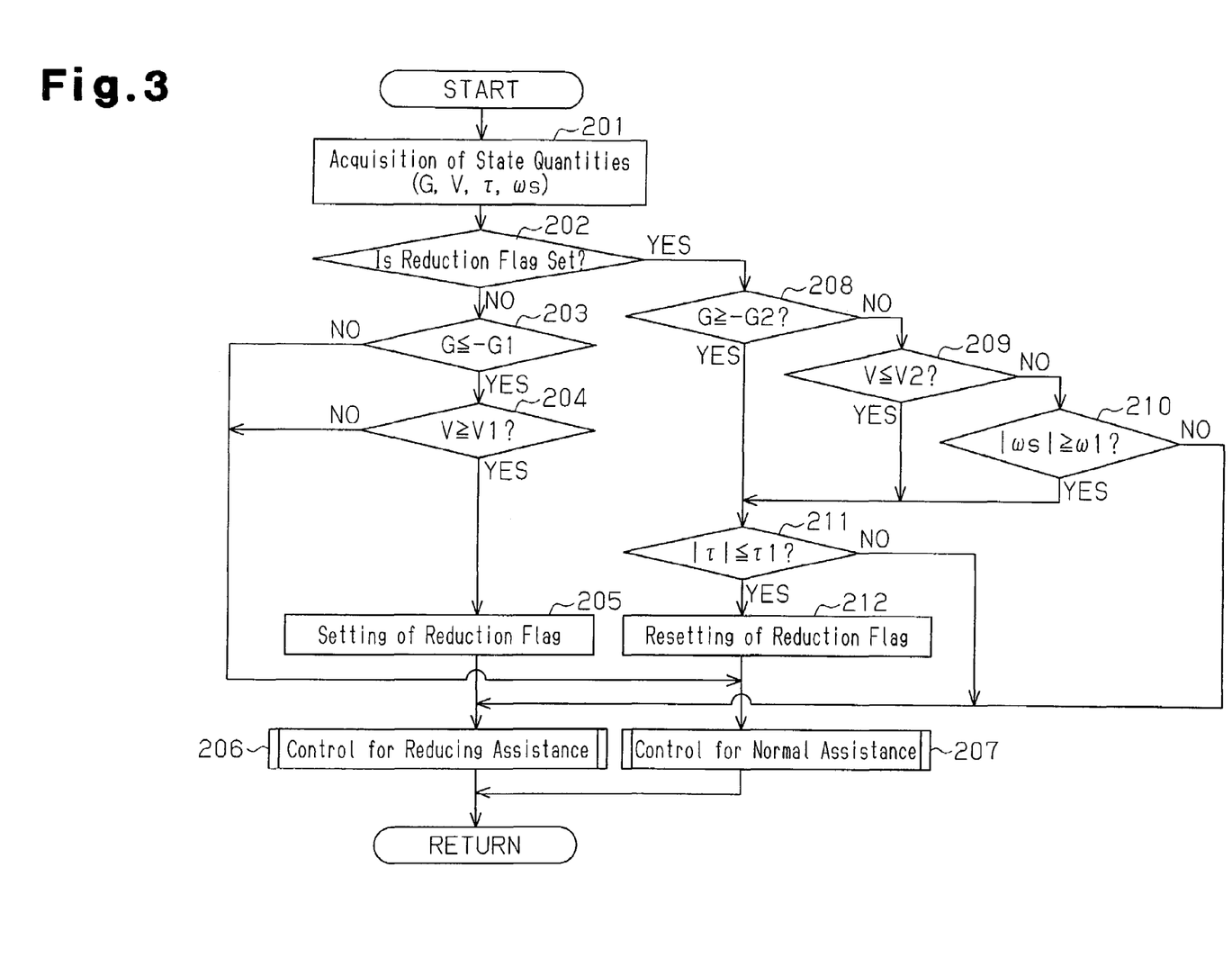
FIG. 3 is a flowchart showing the process for orientation stabilizing control during braking according to a second embodiment.

In detail, as shown in the flowchart of FIG. 3, when the ECU 11 acquires the state quantities (forward/backward acceleration G, vehicle speed V, steering torque τ, and steering speed ωs) used for orientation stabilizing control during braking (Step 201), it is first determined whether a reduction flag which indicates that control for reducing assistance should be carried out has already been set (Step 202). The steering angle speed ωs is acquired by time differentiating the steering angle θ. In the case where no reduction flag has been set (NO in Step 202), the ECU 11 predicts that the vehicle is in such a state that the orientation of the vehicle will easily deflect, that is to say, makes a determination and predicts that the vehicle will deflect (Steps 203 and 204).

Concretely, the ECU 11 determines in the deflection prediction determination whether the forward/backward acceleration G has a value which indicates deceleration greater than the predetermined value G1 (Step 203), and whether the vehicle speed V is the predetermined speed V1 or higher (Step 204). In the case where the forward/backward acceleration G has a value indicating deceleration greater than the predetermined value G1 and the vehicle speed V is the predetermined speed V1 or higher (YES in Step 203 and YES in Step 204: $G \leq -G1$ and $V \geq V1$), the ECU 11 predicts that the orientation of the vehicle will deflect, sets a reduction flag (Step 205), and carries out control for reducing the assistance (Step 206).

In the case where it is determined that the forward/backward acceleration G is not a value indicating deceleration greater than the predetermined value G1 in the above described Step 203 (NO in Step 203: $G > -G1$) or in the case where the vehicle speed V is lower than the predetermined speed V1 in the above described Step 204 (NO in Step 204: $V < V1$), the ECU 11 predicts that the orientation of the vehicle will not deflect. In addition, the ECU 11 carries out normal assist control without setting the reduction flag as described above. That is to say, the ECU 11 controls operation of the EPS actuator 10 in order to generate assist force in accordance with the steering torque τ and the vehicle speed V (Step 207).

Figure 4:
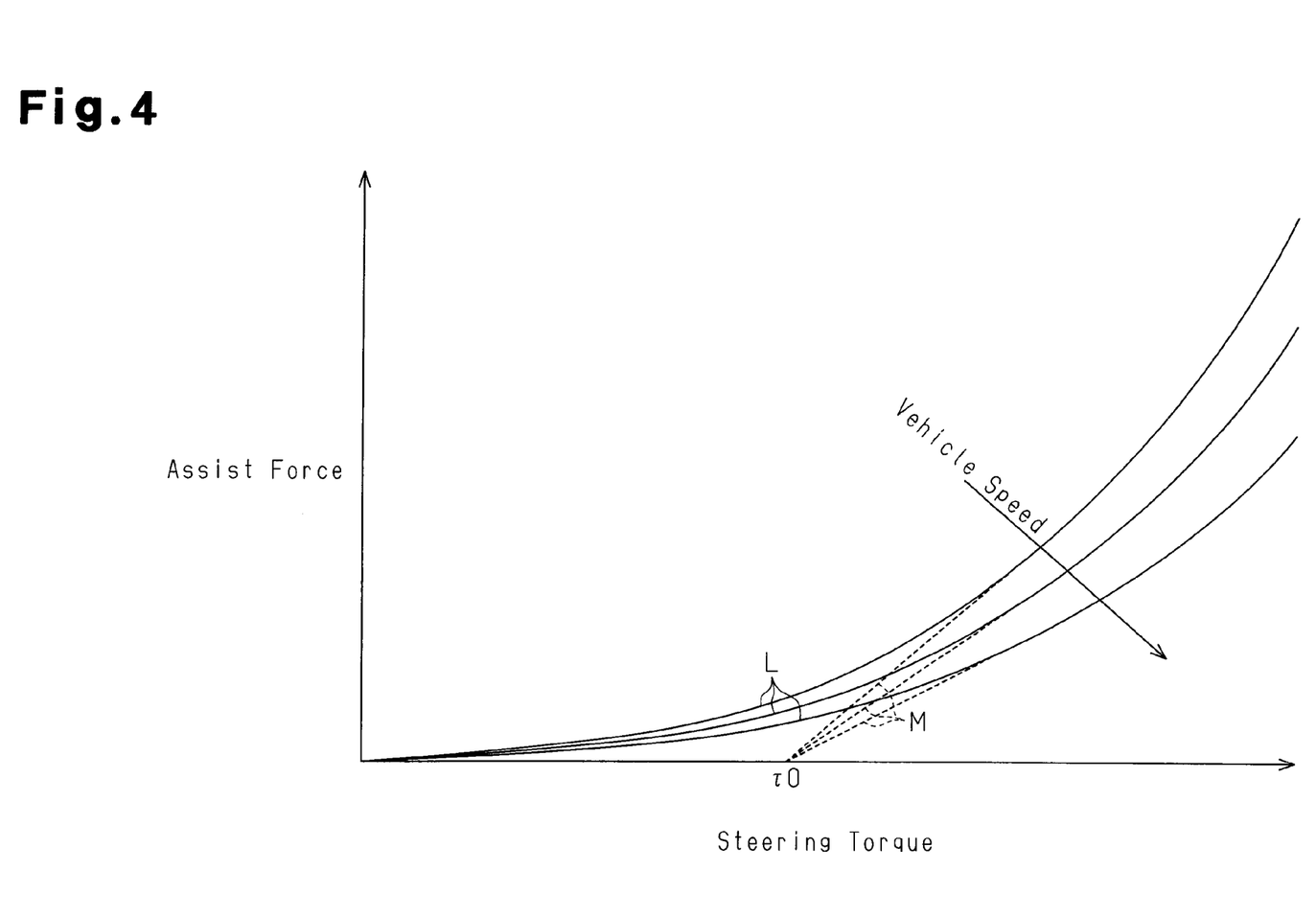
FIG. 4 is a graph showing the manner for control for reducing the assist force according to the second embodiment.

As shown in FIG. 4, the ECU 11 according to the present embodiment sets the assist force to "0" in the assistance reducing control in the case where (the absolute value of) the steering torque τ, is within a range corresponding to the self aligning torque generated when the vehicle deflects, that is to say, is smaller than the upper limit value τ0 of the steering torque τ, which is detected as the self aligning torque ($|\tau| \geq \tau 0$). In the drawing, the solid lines L indicate the assistance properties at the time of normal assist control, and the broken lines M indicate the assistance properties at the time of the assistance reducing control. In the region where the steering torque τ is this upper limit value τ0 or higher ($|\tau| \geq \tau 0$), the greater the steering torque τ is, the smaller the degree of reduction in the assist force provided to the steering system becomes.

That is to say, in the case where it is predicted that the orientation of the vehicle will deflect, the assist force is set to "0," and thus, the self aligning torque, which acts in such a direction as to stabilize the vehicle, can be used effectively without being weakened by this assist force. In addition, in the case where the steering torque τ which exceeds the range corresponding to the self aligning torque generated when the vehicle deflects is detected, it is assumed that the driver is carrying out a certain steering operation. In such cases, the greater the steering torque τ is, the greater the provided assist force is (assist force close to that at the time of normal assist control), and thus, the steering operation is assisted without giving the driver a sense of discomfort.

Meanwhile, in the case where it is determined that the reduction flag has already been set in the above described Step 202 (YES in Step 202), the ECU 11 subsequently determines whether the above described assistance reducing control should be canceled (Steps 208 to 211).

Concretely, the ECU 11 determines whether the forward/backward acceleration G is a value indicating deceleration which is smaller than the deceleration indicated by the predetermined value G2 (Step 208), whether the vehicle speed V is the predetermined speed V2 or lower (Step 209), and whether (the absolute value of) the steering speed ωs is the predetermined speed ω1 or higher (Step 210) in this determination for canceling. The predetermined value G2 and the predetermined speed V2 are set in accordance with the lower limit value (for example −0.2 G and 80 km/h) in the region where it is predicted that the vehicle will easily deflect. The predetermined speed ω1 is set in accordance with the value where it is assumed that the driver has carried out a steering operation. In addition, in the case where it is determined that the forward/backward acceleration G is a value indicating deceleration which is smaller than the deceleration indicated by the predetermined value G2 (YES in Step 208: G≧−G2), the vehicle speed V is the predetermined speed V2 or lower (YES in Step 209: V≦V2), or the steering speed ωs is the predetermined speed ω1 or higher (YES in Step 210: |ωs|≧ω1), the ECU 11 subsequently determines whether (the absolute value of) the steering torque τ is the predetermined threshold value τ1 or lower (Step 211).

In the case where it is determined that the steering torque τ is the predetermined threshold value τ1 or lower (YES in Step 211: |τ|≦τ1), the reduction flag is reset in order to cancel the above described assistance reducing control (Step 212), and normal assist control (Step 207) is carried out.

In the above described Step 211, the determination allows the manner for assist control to return from reduction control to normal control in a state where the steering torque τ is relatively small, and as a result, the steering feel can be prevented from changing together with the switching of this assist control.

In addition, in the case where it is determined that the forward/backward acceleration G is a value indicating deceleration which is greater than the deceleration indicated by the predetermined value G2 (G<−G2), the vehicle speed V is greater than the predetermined speed V2 (V>V2), and the steering speed ωs is smaller than the predetermined speed ω1 (|ωs|<ω1) in the above described Steps 208 to 210 (NO in all of steps 208 to 210), or in the case where it is determined that the steering torque τ is greater than the predetermined threshold value τ1 in Step 211 (NO in Step 211: |τ|>τ1), the ECU 11 determines that the above described assistance reducing control should be continued. Thus, the above described reduction flag is not reset, and the assistance reducing control is carried out (Step 206).

The second embodiment has the following advantages.

(1) The ECU 11 controls the operation of the EPS actuator 10 in order to reduce the assist force provided to the steering system in the case where the detected forward/backward acceleration G has a value indicating deceleration greater than the predetermined value G1 (a negative value in the case where a value in the direction in which the vehicle moves is defined as a positive value, that is to say, G≦−G1) and in the case where the vehicle speed V is the predetermined speed V1 or higher.

That is to say, in the case where the detected forward/backward acceleration G has a value indicating deceleration greater than the predetermined value G1, which is considered to be sudden application of the brakes causing deceleration no smaller than the predetermined deceleration, and in the case where the vehicle speed V has a value indicating that the vehicle is running at a high speed no lower than the predetermined speed V1, the possibility of the orientation of the vehicle deflecting as described above is extremely high. Accordingly, as in the above described configuration, the orientation of the vehicle is predicted to deflect, and the assistance reducing control is carried out in advance before the predicted deflection takes place. Thus, the self aligning torque, which acts in such a direction as to stabilize the vehicle afterwards, can be effectively used. As a result, the orientation of the vehicle is stabilized more smoothly.

(2) The ECU 11 sets the assist force to "0" in the assistance reducing control in the case where (the absolute value of) the detected steering torque τ is within a range corresponding to the self aligning torque generated at the time of deflecting of the vehicle (|τ|<τ0). In addition, in the region where the steering torque τ is the upper limit value τ0 or higher (|τ|≧τ0), the greater this steering torque τ is, the smaller the degree of reduction in the assist force provided to the steering system becomes.

In the above described configuration, in the case where it is predicted that the orientation of the vehicle will deflect, the assist force is set to "0," and thus, the self aligning torque, which acts in such a direction as to stabilize the vehicle, can be used effectively without being weakened by this assist force. In addition, in the case where the steering torque τ is detected when it is assumed that the driver is carrying out a certain steering operation, the greater this steering torque τ is, the greater the provided assist force becomes (assist force close to that at the time of normal assist control). Thus, the steering operation is assisted without giving the driver a feeling of discomfort.

The configuration according to the above described embodiments may be modified as follows.

Figure 5:
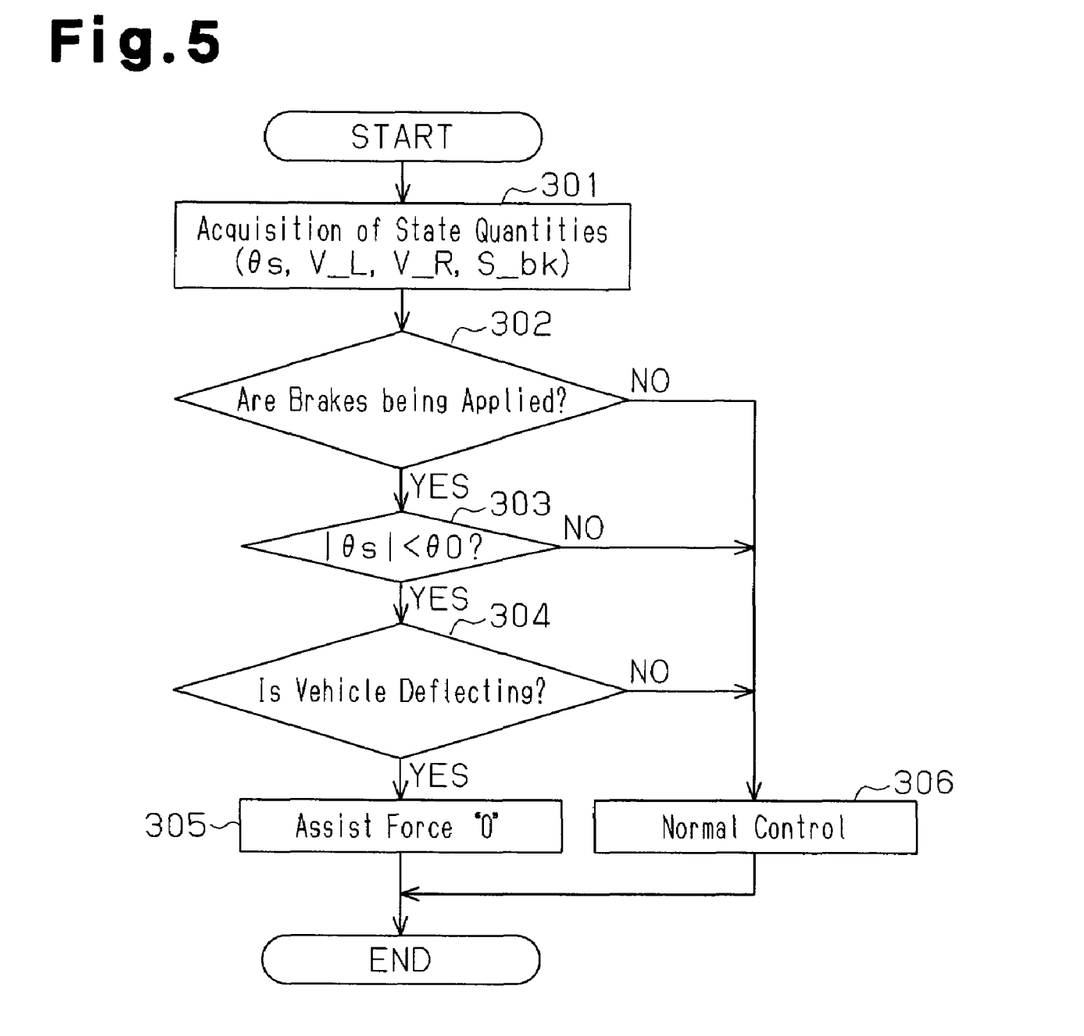
FIG. 5 is a flowchart showing the process for orientation stabilizing control during braking according to a first modification.

According to the first embodiment, in the case where it is determined that the orientation of the vehicle is deflecting, the assist force provided to the steering system is simply reduced. However, it is preferable for an appropriate degree of reduction in the assist force to be set in accordance with the specifications of the vehicle. In addition, as shown in the flowchart of FIG. 5, a configuration for reducing the assist force to "0" (Step 305) may be adopted. In this configuration, the self aligning torque, which acts in such a direction as to stabilize the vehicle, can be used effectively without being weakened by the assist force. The process in Steps 301 to 304 and Step 306 in the flowchart of FIG. 5 are the same as the process in Steps 101 to 104 and Step 106 in the flowchart of FIG. 2, and therefore, descriptions thereof are omitted. Furthermore, In the case where the detected steering torque τ is within a range corresponding to the self aligning torque generated when the vehicle deflects, as in the second embodiment, the configuration where the assist force is reduced to "0" may be adopted.

According to the first embodiment, the assist force when the vehicle deflects is reduced in the case where the absolute value of the steering angle θs is smaller than the predetermined threshold value θ0 (see FIG. 2, Step 103). However, this condition may be omitted. That is to say, the orientation of the vehicle sometimes deflects without the driver's intent at the time of braking during turning, and such cases can be dealt with by omitting the above described condition that the vehicle be moving straight forward.

Figure 6:
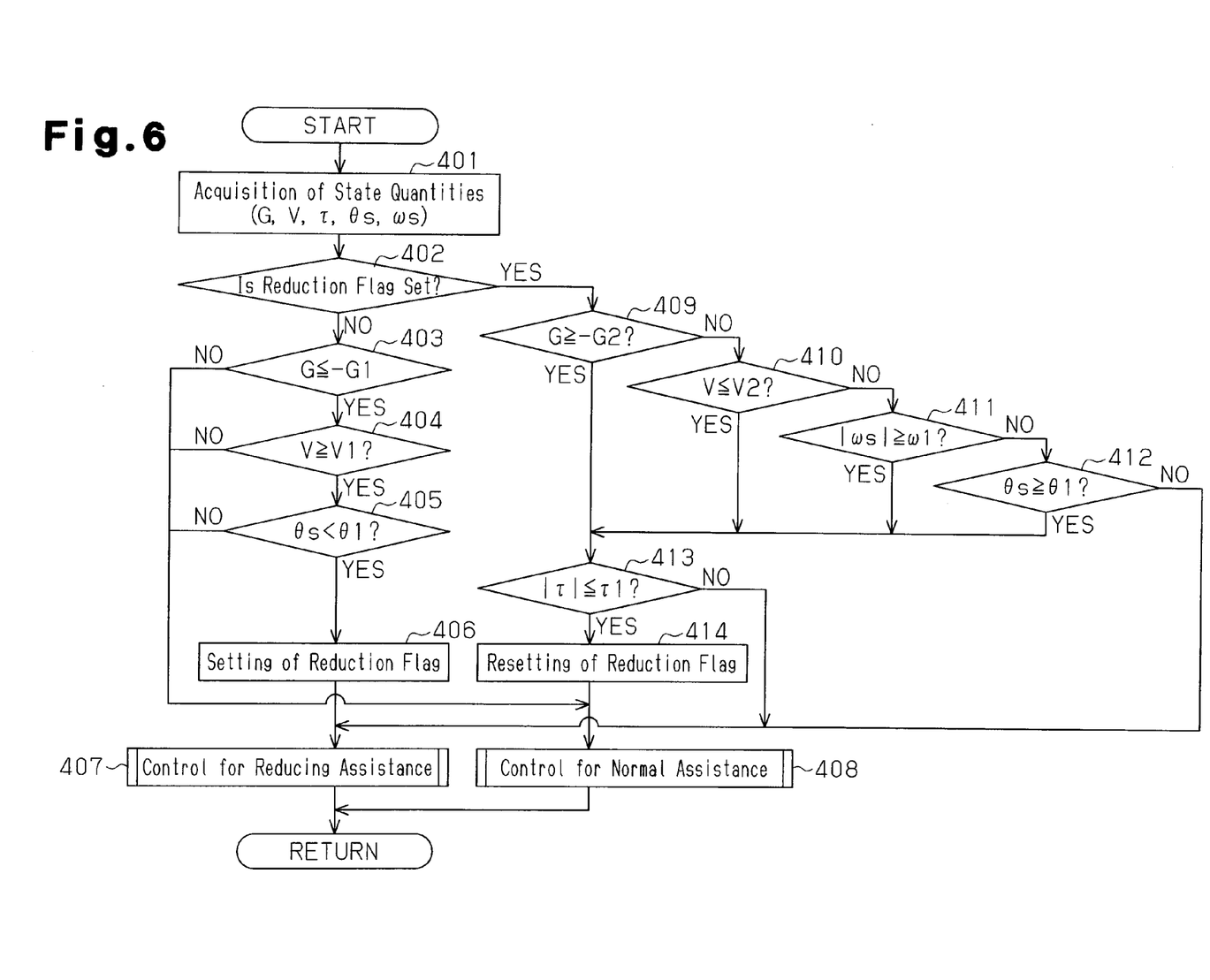
FIG. 6 is a flowchart showing the process for orientation stabilizing control during braking according to a second modification.

In addition, in the case where the assist force is reduced on the basis of the prediction that the vehicle will deflect, as in the second embodiment, determination that the vehicle is in such a state as to be moving straight forward may be adopted, as in the first embodiment. As shown in the flowchart of FIG. 6, for example, in the case where the orientation of the vehicle is predicted to deflect as a result of the prediction of deflection in Steps 403 and 404 (YES in Step 403 and YES in Step 404: G≦−G1 and V≧V1), subsequently, it is determined whether (the absolute value of) the steering angle θs is smaller than the predetermined threshold value θ1 (Step 405). The determination of the steering angle conditions in this Step 405 is determination that the vehicle is in such a state as to be moving straight forward, where it is determined the steering angle θs is within a predetermined angle range in the vicinity of neutral, that is to say, whether the brakes are being applied in such a state that the vehicle is moving approximately straight forward, in the same manner as the conditions for determining the steering angle according to the first embodiment (see FIG. 2, Step 103). In addition, in the case where it is determined that the steering angle θs is smaller than the predetermined threshold value θ1 (YES in Step 405: |θs|<θ1), a reduction flag is set (Step 406) and the assistance reducing control is carried out (Step 407). In the case where the condition for the steering angle is not met in this Step 405 (NO in Step 405: |θs|≧θ1), control for normal assistance (Step 408) may be carried out without setting the reduction flag. The assist force may be reduced when the state of the vehicle is limited to one where the vehicle is moving straight forward, as described above, and thus, the above described specific cases (for example intentional operation by the driver) can be excluded, and the orientation of the vehicle is prevented from deflecting in a manner not intended by the driver with high precision.

In addition, such steering angle condition may be added to the determination for canceling the assistance reducing control. That is to say, as shown in FIG. 6, determination of the steering angle condition (Step 412) is carried out subsequent to the determination of the acceleration (deceleration) condition, the determination of the speed condition, and the determination of steering speed condition (Steps 409 to 411). In addition, also in the case where the steering angle θs is the predetermined threshold value θ1 or larger in the determination of the steering angle condition in Step 412 (YES in Step 412: |θ|≧θ1), the reduction flag is reset (Step 413). As a result, it becomes possible to assist this steering operation without giving the driver a feeling of discomfort by canceling the assistance reducing control in the case where the steering operation is being carried out by the driver, even during the assistance reducing control.

The processes in Steps 401 to 404, Steps 406 to 408, Steps 409 to 411, Step 413 and Step 414 in the flowchart of FIG. 6 are the same as the processes in Steps 201 to 204, Steps 205 to 207, Steps 208 to 210, Step 211 and Step 212 in the flowchart of FIG. 3, respectively, and therefore, descriptions thereof are omitted.

Furthermore, determination of the steering speed condition as that shown in Step 411 in FIG. 6 may be carried out so as to correspond to the determination of the conditions for commencing the assistance reducing control, which is carried out subsequently to the above described sensing of the change or prediction of deflection, that is to say, the determination of the steering angle condition shown in Step 405 in FIG. 6. That is to say, in the case where (the absolute value of) the steering speed ωs is the predetermined speed ω1 or higher (|ωs|≧ω1), it can be assumed that the driver is carrying out a steering operation. Accordingly, the above described determination of the steering speed condition is added, and thus, it becomes possible to assist the steering operation in an appropriate manner, without giving the driver a feeling of discomfort.

According to the first embodiment, the determination as to whether the orientation of the vehicle is deflecting (see FIG. 2, Step 104) is carried out on the basis of the steering angle θs and the left and right wheel speeds V_L and V_R. However, the manner for determination is not limited to this, and the above described determination, may be carried out in, for example, a vehicle having a yaw rate sensor, through detection of the actual yaw rate.

Figure 7:
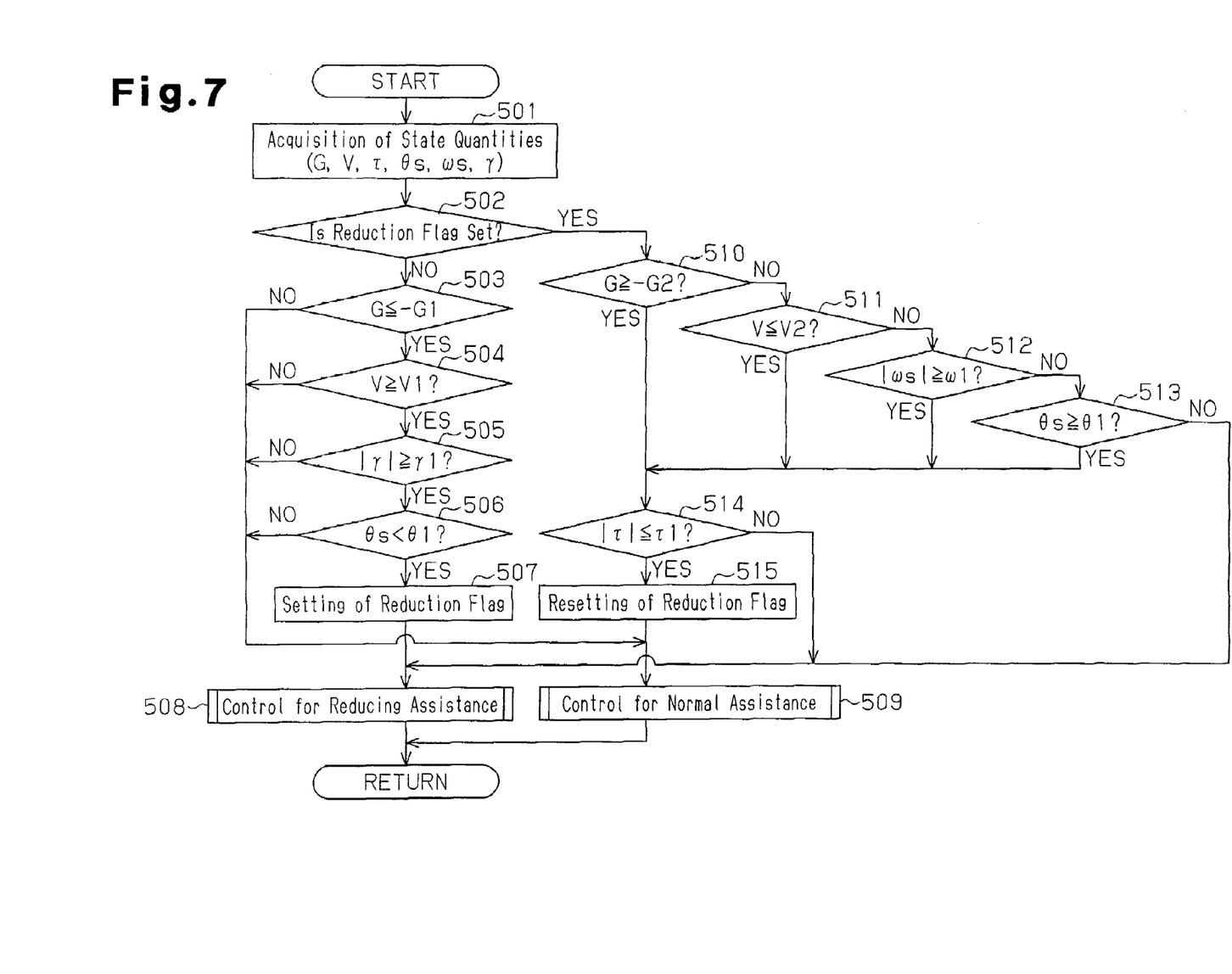
FIG. 7 is a flowchart showing the process for orientation stabilizing control during braking according to a third modification.

Furthermore, the above described yaw rate condition and the wheel speed difference condition, for example, may be added to the prediction that the vehicle will deflect also in the case where the assist force is reduced on the basis of the prediction that the vehicle will deflect, as in the second embodiment. As shown in the flowchart of FIG. 7, for example, in the prediction that the vehicle will deflect, following the determination for the conditions for acceleration (or deceleration) (Step 503) and the determination of the speed condition (Step 504), it is determined whether (the absolute value of) the yaw rate γ is the predetermined threshold value γ1 or higher (Step 505). It is not necessary for the threshold value γ1, in terms of the yaw rate γ in this case, to be the same as the threshold value in the case where the yaw rate condition is added to the determination as to whether deflection is sensed according to the above described first embodiment, and the threshold value may be an appropriate value for this "prediction." In addition, in the case where it is determined that the yaw rate γ is the predetermined threshold value γ1 or higher (YES in Step 505: |γ|≧γ1), the determination of the state where the vehicle is moving straight forward (Step 506) is carried out on the basis of the steering angle θs, and in the case where the steering angle condition is met (YES in Step 506: |θ|<θ1), a reduction flag is set (Step 507) and control for reducing the assist is carried out (Step 508). In the case where it is determined that the yaw rate γ is smaller than the predetermined threshold value γ1 in Step 505 (NO in Step 505: |γ|<γ1), the above described determination of the state where the vehicle is moving straight forward (Step 506) is not carried out and the reduction flag (Step 507) is not set, but the normal assistance control is carried out (Step 508). In this configuration, deflection in the orientation of the vehicle can be predicted with higher precision.

The processes in Steps 501 to 504 and Steps 506 to 515 in the flowchart of FIG. 7 are the same as the processes in Steps 401 to 404 and Steps 405 to 414 in the flowchart of FIG. 6, respectively, and therefore, descriptions thereof are omitted. In addition, the determination of the yaw rate condition in Step 506 in FIG. 7 may be changed to determination of the wheel speed difference or determination of yaw angle acceleration.

According to the first embodiment, determination of braking (see FIG. 2, Step 102) is carried out on the basis of the brake signal S_bk. However, the invention is not limited to this, and the above described determination may be carried out on the basis of the acceleration (or deceleration) gained by differentiating the vehicle speed V.

In addition, determination of braking in accordance with prediction that the vehicle will deflect may be carried out depending on whether a braking operation is being carried out also in the case where the assist force is reduced on the basis of the prediction that the vehicle will deflect, as in the second embodiment. Concretely, the process shown in the flowchart of FIG. 8, for example, may be adopted.

Figure 8:
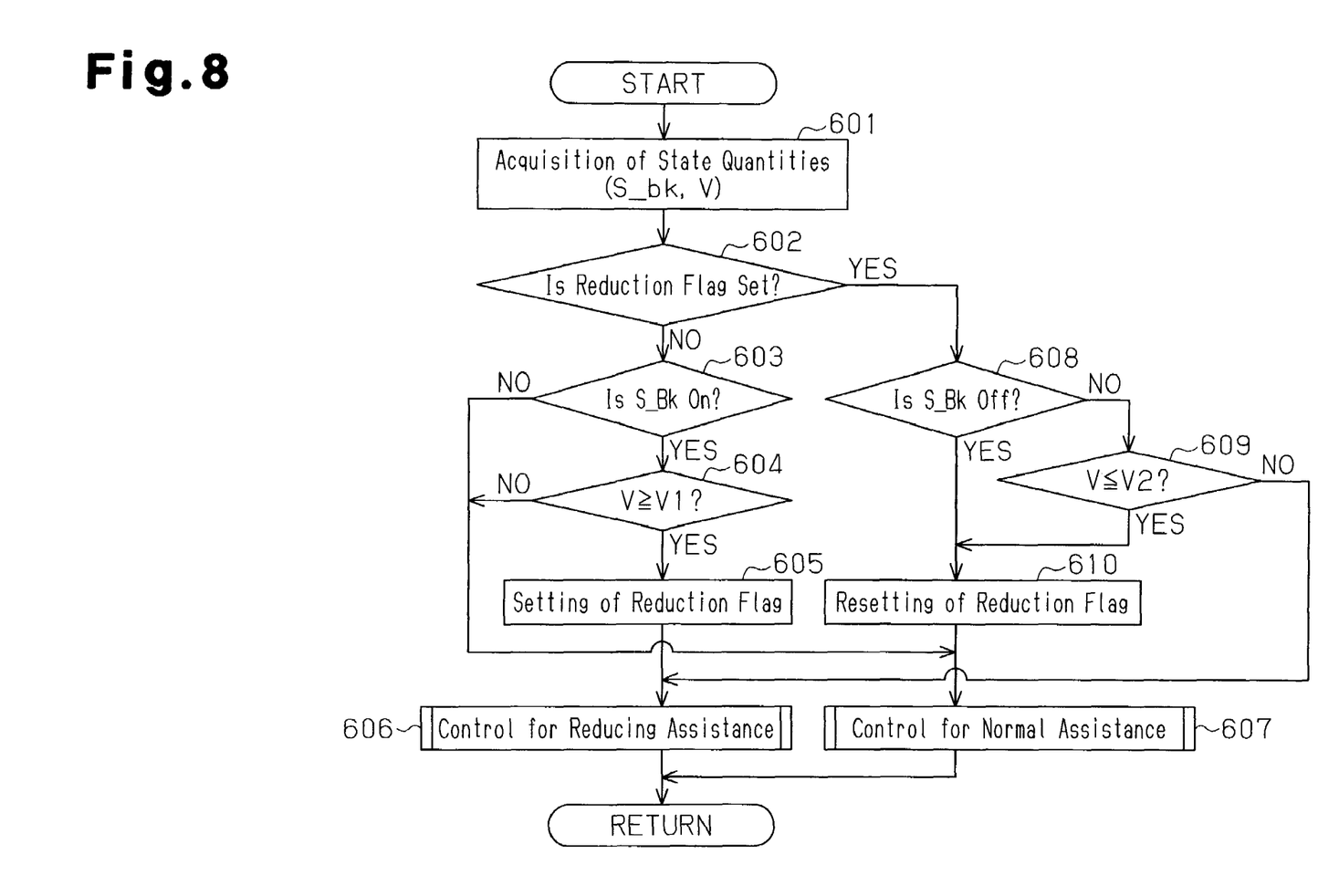
FIG. 8 is a flowchart showing the process for orientation stabilizing control during braking according to a fourth modification.

That is to say, first, the vehicle speed V and the brake signal S_bk are acquired as the state quantities, which are used for the orientation stabilizing control during braking (Step 601). Next, it is determined whether a reduction flag is set (Step 602), and in the case where a reduction flag is not set (NO in Step 602), it is determined whether the brake signal S_bk is on (Step 603) and whether the vehicle speed V is the predetermined speed V1 or higher (Step 604). In addition, in the case where the brake signal S_bk is on and the vehicle speed V is the predetermined speed V1 or higher (YES in Step 603 and YES in Step 604: S_bk is on and V≧V1), the orientation of the vehicle is predicted to deflect and the reduction flag is set (Step 605). Thus, the assistance reducing control is carried out (Step 606). In addition, in the case where it is determined that the brake signal S_bk is not on in the above described Step 603 (NO in Step 603: Sb_k is off), or in the case where the vehicle speed V is lower than the predetermined speed V1 in the above described Step 604 (NO in Step 603: V<V1), the orientation of the vehicle is predicted not to deflect. Thus, the above described reduction flag is not set, and the normal assistance control is carried out (Step 607).

Meanwhile, in the case where it is determined that the reduction flag has already been set in the above described Step 602 (YES in Step 602), it is next determined whether the brake signal S_bk is off (Step 608) and whether the vehicle speed V is the predetermined speed V2 or lower (Step 609). Then, in the case where it is determined that the brake signal S_bk is off (YES in Step 608: S_bk is off), or the vehicle speed V is the predetermined speed V2 or lower (YES in Step 609: V≦V2), the reduction flag is reset in order to cancel the above described assistance reducing control (Step 610), and the normal assistance control is carried out (Step 607). In the case where the brake signal S_bk is not off (NO in Step 608: Sb_k is on) and the vehicle speed V is greater than the predetermined speed V2 (NO in Step 609: V>V2) in the above described Steps 608 and 609, the above described reduction flag is not reset, and the assistance reducing control (Step 607) is carried out. This configuration has the same advantages as the second embodiment, and furthermore, has an advantage such that it can be implemented with a simpler configuration.

According to the first embodiment, a case where the vehicle speed is the predetermined speed or higher or a case where the brakes are suddenly applied so that the deceleration is a predetermined deceleration or higher may be added as a condition for carrying out the assist force reducing control when the orientation of the vehicle deflects. That is to say, the orientation of the vehicle at the time of braking easily deflects when braking starts in a state where the vehicle is running at high speed or the brakes are suddenly applied. Accordingly, in the above described configurations, the orientation of the vehicle can be prevented from deflecting in a manner not intended by the driver with higher precision.

The determinations of the conditions included in the determination for canceling the assistance reducing control may be changed as necessary. Although in the above described second embodiment, for example, the determination for canceling includes the steering torque condition (see FIG. 3, Step 211), it is not necessary to adopt a configuration including this.

What is claimed is:

1. An electric power steering apparatus for a vehicle having a steering system and a torsion bar provided in the middle of a steering transmitting system connecting a steering wheel to a steered wheel, the apparatus comprising:
   a steering force assisting device having a motor, wherein the steering force assisting device provides an assist force that assists the steering operation to the steering system using the motor as a drive source;
   a torque sensor that detects steering torque based on a torsion angle of the torsion bar;
   a control section that controls the assist force generated by the steering force assisting device based on the detected steering torque; and
   a deflection sensing section that senses deflection in an orientation of the vehicle,
   wherein the control section reduces the assist force generated by the steering force assisting device when the deflection sensing section senses a deflection and braking of the vehicle occurs when a steering angle of the steering wheel is within a predetermined angle range in the vicinity of neutral.

2. The electric power steering apparatus according to claim 1, wherein the control section reduces the assist force when braking of the vehicle occurs and a vehicle speed of the vehicle is a predetermined speed or higher.

3. The electric power steering apparatus according to claim 1, wherein the control section reduces the assist force when braking of the vehicle and the brakes are suddenly applied so that the deceleration becomes a predetermined deceleration or higher.

4. The electric power steering apparatus according to claim 1, wherein the control section reduces the assist force when braking of the vehicle occurs and a steering speed is a predetermined speed or lower.

5. The electric power steering apparatus according to claim 1, wherein the control section reduces the assist force to zero.

6. The electric power steering apparatus according to claim 1, wherein the control section reduces the assist force to zero when the steering torque is within a range corresponding to a self aligning torque generated during a deflection of the vehicle.

7. An electric power steering apparatus for a vehicle having a steering system and a torsion bar provided in the middle of a steering transmitting system connecting a steering wheel to a steered wheel, the apparatus comprising:
   a steering force assisting device having a motor, wherein the steering force assisting device provides an assist force that assists the steering operation to the steering system using the motor as a drive source;
   a torque sensor that detects steering torque based on a torsion angle of the torsion bar; and
   a control section that controls the assist force generated by the steering force assisting device based on the detected steering torque;
   wherein the control section reduces the assist force generated by the steering force assisting device when a vehicle speed of the vehicle is a predetermined speed or higher and braking of the vehicle occurs when a steering angle of the steering wheel is within a predetermined angle range in the vicinity of neutral.

8. The electric power steering apparatus according to claim 7, wherein the control section reduces the assist force when braking of the vehicle occurs such that the brakes are suddenly applied so that a deceleration of the vehicle becomes a predetermined deceleration or higher.

9. The electric power steering apparatus according to claim 7, wherein the control section reduces the assist force when braking of the vehicle occurs and a in steering speed is a predetermined speed or lower.

10. The electric power steering apparatus according to claim 7, wherein the control section reduces the assist force to zero.

11. The electric power steering apparatus according to claim 7, wherein the control section reduces the assist force to zero when the steering torque is within a range corresponding to the self aligning torque generated during the deflection of the vehicle.

12. An electric power steering apparatus for a vehicle having a steering system and a torsion bar provided in the middle of a steering transmitting system connecting a steering wheel to a steered wheel, the apparatus comprising:
   a steering force assisting device having a motor, wherein the steering force assisting device provides an assist force that assists the steering operation to the steering system using the motor as a drive source;
   a torque sensor that detects steering torque based on a torsion angle of the torsion bar;
   a control section that controls the assist force generated by the steering force assisting device based on the detected steering torque; and a deflection predicting section that predicts deflection in an orientation of the vehicle when braking of the vehicle occurs, wherein the control section reduces the assist force generated by the steering force assisting device when deflection is predicted by the deflection predicting section and when a steering angle of the steering wheel is within a predetermined angle range in the vicinity of neutral.

13. The electric power steering apparatus according to claim 12, wherein the control section reduces the assist force to zero.

14. The electric power steering apparatus according to claim 12, wherein the control section reduces the assist force to zero when the steering torque is within a range corresponding to the self aligning torque generated during the deflection of the vehicle.

15. An electric power steering apparatus for a vehicle having a steering system and a torsion bar provided in the middle of a steering transmitting system connecting a steering wheel to a steered wheel, the apparatus comprising:

a steering force assisting device having a motor, wherein the steering force assisting device provides an assist force that assists the steering operation to the steering system using the motor as a drive source;

a torque sensor that detects steering torque based on a torsion angle of the torsion bar;

a control section that controls the assist force generated by the steering force assisting device based on the detected steering torque; and a deflection sensing section that senses deflection in an orientation of the vehicle, wherein the control section reduces the assist force generated by the steering force assisting device when the deflection sensing section senses a deflection and braking of the vehicle occurs, and wherein the control section reduces the assist force to zero when the steering torque is within a range corresponding to a self aligning torque generated during a deflection of the vehicle.

16. The electric power steering apparatus according to claim 7, wherein the control section reduces the assist force based on a comparison between the steering torque detected by the torque sensor and a self aligning torque generated during a deflection of the vehicle such that the assist force does not weaken the self aligning torque during the deflection, and wherein when the steering torque exceeds a range corresponding to the self aligning torque generated when the vehicle deflects is detected, the control section adjusts the assist force such that the assist force increases when the steering torque increases.

17. The electric power steering apparatus according to claim 12, wherein the control section reduces the assist force based on a comparison between the steering torque detected by the torque sensor and a self aligning torque generated during a deflection of the vehicle such that the assist force does not weaken the self aligning torque during the deflection, and wherein when the steering torque exceeds a range corresponding to the self aligning torque generated when the vehicle deflects is detected, the control section adjusts the assist force such that the assist force increases when the steering torque increases.

* * * * *